United States Patent Office 3,196,347
Patented July 20, 1965

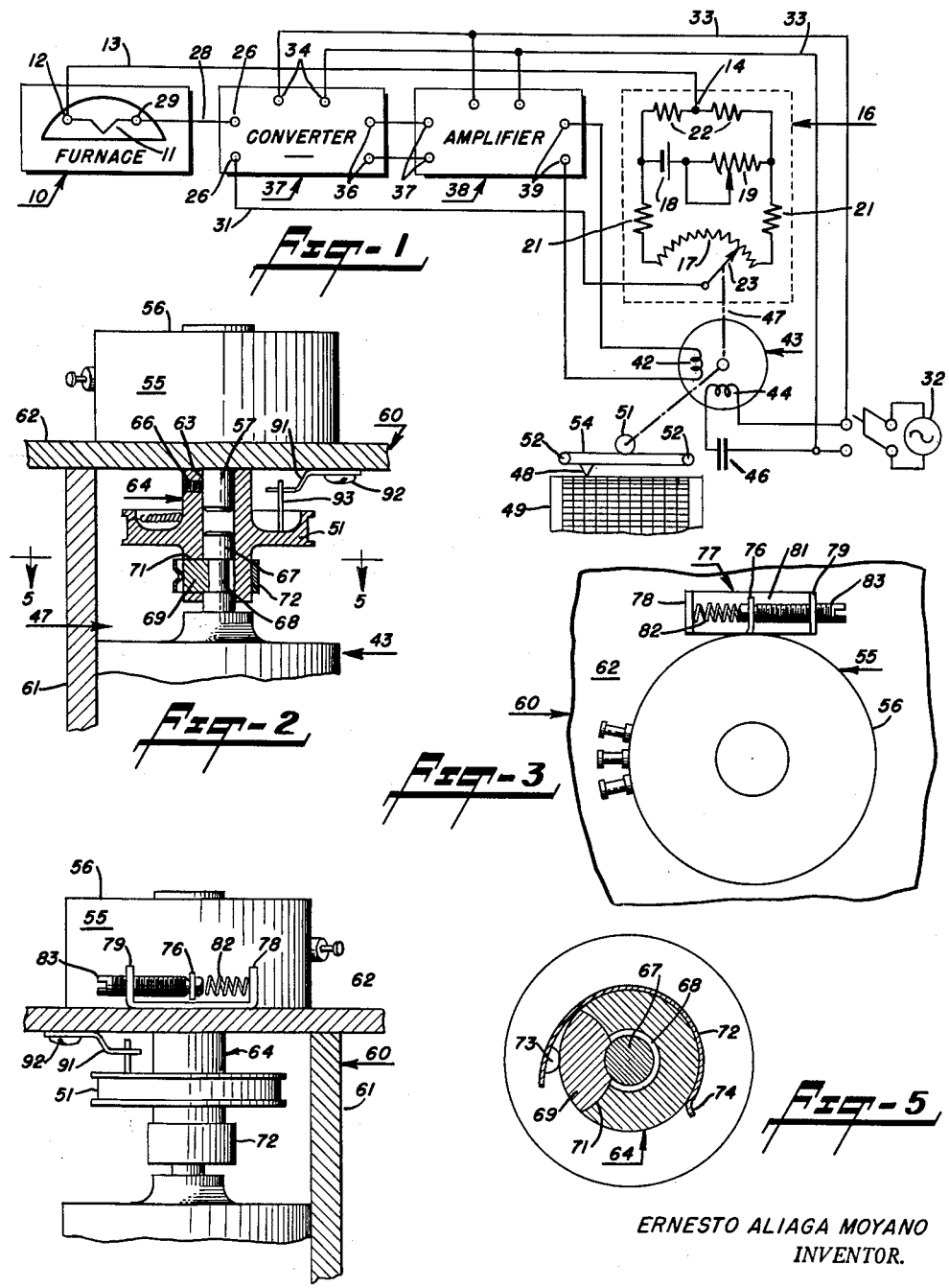

3,196,347
AUTOMATIC REBALANCING NETWORK INCLUDING A MOVABLY MOUNTED POTENTIOMETER AND SLIP CLUTCH CONNECTION THERETO
Ernesto Aliaga Moyano, New York, N.Y., assignor to Thermo Electric Co., Inc., Saddle Brook, N.J., a corporation of New Jersey
Filed May 9, 1961, Ser. No. 108,856
6 Claims. (Cl. 324—99)

This invention relates to a recording and/or control instrument, or the like, and more particularly to an improved mounting and clutch arrangement for a potentiometer employed in a null point potentiometric network within the instrument.

Measuring, or measuring and recording instruments with which my novel potentiometer mounting and clutch arrangement is adapted to be used are designed to measure, or measure and record, the output from such primary sources as, thermocouples, tachometer generators, photoelectric cells, resistance thermometer bulbs, or any transducer or converter that provides an electrical output which varies in accordance with changes in a condition to be measured. Such instruments may be employed to measure flow, temperature, pressure, weight, and the like, by using suitable converters to provide an electrical input. For purposes of illustration, an arrangement for the measurement of the temperature of a furnace is described.

The measuring and recording instrument may employ one of several types of circuitry, including potentiometric, Wheatstone bridge, and current balancing circuits. For purposes of illustration, the potentiometer mounting and clutch arrangement of my invention is described herein as used in conjunction with a potentiometric type instrument used in the measurement of furnace temperature. It will be apparent that the mounting arrangement may be used on other types of instruments employing different balancing circuits.

An object of this invention is the provision of a simple mounting arrangement for a potentiometer in which the potentiometer is free to assume a position of alignment between the potentiometer shaft and a drive shaft therefor.

An object of this invention is the provision of a potentiometer mounting arrangement whereby the potentiometer is easily and readily removed and replaced in an instrument employing the same.

An object of this invention is the provision of a simple combination clutch and coupling arrangement for securing a potentiometer shaft to a drive shaft.

These and other objects and advantages will become apparent from the following description when taken with the accompanying drawings. It will be understood that the drawings are for purposes of illustration, and are not to be construed as defining the scope or limits of the invention, reference being had for the latter purpose to the appended claims.

In the drawings wherein like reference characters denote like parts in the several views:

FIGURE 1 is a simplified diagrammatic presentation of a potentiometric recorder circuit for use in the measurement of the temperature of a furnace;

FIGURE 2 is a fragmentary front elevational view showing a potentiometer mounting arrangement embodying my invention, with parts being shown broken away for clarity;

FIGURE 3 is a fragmentary top view of the arrangement shown in FIGURE 2;

FIGURE 4 is a fragmentary rear elevational view of the arrangement; and

FIGURE 5 is an enlarged sectional view taken on line 5—5 of FIGURE 2.

Reference is first made to FIGURE 1 of the drawings wherein there is shown a furnace 10 within which there is located a thermocouple 11 for the measurement of the furnace temperature. One terminal 12 of the thermocouple is connected through a lead wire 13 to one terminal 14 of a null-point potentiometric network 16. The potentiometric network includes a circular slide wire 17 connected across a fixed voltage, such as a battery 18, through an adjustable resistor 19 and fixed resistors 21, 21. The lead wire 13, from the thermocouple, is connected through fixed resistors 22, 22 to the network. The thermocouple voltage is opposed to the potential drop across a variable portion of the slide wire 17, as determined by the position of a rotatable contact 23.

The potential unbalance between the thermocouple 11 and the voltage derived from the potentiometric network 16 is fed to the input terminals 26, 26 of a converter 27 by means of a lead wire 28 from the terminal 29 of the thermocouple 11, and a lead wire 31 from the rotatable potentiometer arm 23. The converter 27, which is not shown in detail, may be of any suitable type, such as a vibrator. A typical vibrator includes a movable contact which is actuated in opposite directions to alternately make and break electrical contact with a pair of spaced fixed contacts. Vibration of the movable contact is obtained by use of a source of alternating potential 32 which is connected through lead wires 33, 33 to terminals 34, 34 in the vibrator. The vibrator opens and closes the series connected thermocouple and potentiometer network circuits at the frequency of the alternating source 32. By use of a suitably connected transformer, having a center-tapped primary winding in the vibrator circuit, the potential unbalance between the thermocouple and potentiometric network is converted to a pulsating potential at the vibrator output terminals 36, 36.

The vibrator output terminals 36, 36 are connected to the input terminals 37, 37 of an amplifier 38, where the potential unbalance is amplified and appears at the amplifier output terminals 39, 39. Power for the amplifier is supplied by the source of alternating potential 32. Any suitable amplifier circuitry may be used. The output terminals 39, 39 of the amplifier 38 are connected to the control winding 42 of a two-phase, reversible, control motor 43. The reference winding 44 of the motor is connected to the source of alternating potential 32 through a capacitor 46. The motor will thus be energized for rotation in one direction or the other, depending upon the phase of the current in the control winding 42 with respect to the current in the reference winding 44 which, in turn, will depend upon the direction of unbalance of the potentiometric circuit 16, as will be understood by those skilled in this art. The motor 43 is connected through a linkage, designated 47, to the rotatable contact 23 in the potentiometric network, and moves the contact in a direction to rebalance the potentiometric system; the resulting balance point corresponding to the temperature of the furnace 10.

The motor 43, in addition to driving the potentiometer wiper contact 23, may also serve to move a pen, or stylus, 48 across a chart 49 as by means of a drive pulley 51, pulleys 52, 52 and a drive cable 54. The chart 49 may be driven in any suitable manner.

Reference is now made to FIGURES 2–4 wherein a potentiometer 55, having a case 56, is shown, which potentiometer may include the circular slide wire 17 and rotatable contact 23 shown diagrammatically in FIGURE 1. The potentiometer has a shaft 57 for positioning the potentiometer wiper contact. The motor 43 is suitably secured to an upright supporting member 61 which, in turn, is secured to a supporting plate 62; the member 61 and plate 62 comprising a portion of a frame, designated 60. The potentiometer shaft 57 extends through a clearance hole formed in the plate 62, and into the axial aperture 63 in a hub member 64. The latter is secured to the shaft by means of a set screw 66. The pulley, or sheave, 51 for driving the stylus (shown in FIGURE 1) is integraly formed on the hub 64.

The motor 43 has a motor drive shaft 67, which extends into the opposite end of the bore through the hub 64, and is secured thereto by a novel clutch arrangement. An annular groove 68 is formed in the motor shaft 67 within which groove a shoe piece 69 of the clutch mechanism fits; the shoe piece extending through a slot 71 formed through the wall of the hub 64 and having a concave surface which engages the shaft. A ring spring 72 partially encircles the hub 64 and resiliently biases the shoe piece against the motor shaft 67 at the annular groove 68 formed therein. A protrusion 73 formed adjacent one end of the spring 72 assures engagement of the spring with the shoe piece even if the shoe piece is positioned entirely within the outside diameter of the hub 64. As seen in FIGURE 5, the free end of the spring opposite the protrusion 73 is formed with an outwardly turned portion 74 for easy finger removal of the spring from the hub.

It will be seen, then, that the potentiometer 55 is supported from its shaft 57 by the motor shaft 67, the shafts 57 and 67 being positively axially and radially coupled together, but relatively rotatable one to the other if the potentiometer shaft is stalled. In order to allow for any misalignment between the potentiometer and motor shafts, no additional fixed mounting means relatively laterally locating the said potentiometer and motor shafts may be employed in the support of the potentiometer. However, the potentiometer housing 56 which carries the slide wire must obviously be fixed in a manner to prevent rotation thereof upon rotation of the potentiometer shaft 57. I employ a novel construction for rotatably retaining and rotatably adjusting the potentiometer housing while permitting lateral, or radial, movement thereof, which construction comprises a tab 76 extending from the side of the potentiometer case 56. A U-shaped bracket 77, having a pair of parallel arms 78 and 79 interconnected by a base member 81, is fixedly secured to the supporting plate 62, with the tab 76 positioned intermediate the arms thereof. A compression spring 82 is positioned between the tab 76 and one arm 78 of the bracket. An adjusting screw 83 is threaded within a tapped hole formed in the arm 79 of the bracket, with the screw extending between the arm 79 and tab 76. The compression spring 82 resiliently biases the tab 76 against the screw 83 but still allowing for misalignment between the potentiometer and motor shafts. By rotation of the screw 83, the mechanical zero position of the potentiometer is readily adjustable.

A stop member 91 may be secured to the mounting plate 62 by a screw 92, and a pin 93 suitably secured to the pulley 51 is adapted to engage the same to limit the rotary travel of the potentiometer shaft. If, during operation, the potentiometer shaft is rotated without reaching the balance condition, the pin will engage the stop member 91 to stop the turning of the potentiometer shaft 57 and the attached pulley 51. The motor shaft 67 is free to continue rotating, however, thereby avoiding overloading of the motor gearing; the shaft 67 rotating relative to the shoe piece 69 in the slot in the hub 64. A spring 72, of suitable strength, is selected to permit such relative rotation when the hub 64 is stopped. The spring 72 is sufficiently strong to provide adequate frictional engagement between the shoe piece 69 and motor shaft 67 to drive the hub 64 and attached potentiometer shaft 57 when the same are free to rotate.

Having now described my invention in detail, in accordance with the requirements of the Patent Statutes, various changes and modifications will suggest themselves to those skilled in this art. It is intended that such changes and modifications shall fall within the spirit and scope of the invention as recited in the following claims.

I claim:

1. In a measuring instrument having a frame, a balancing motor having a shaft, means securing the balancing motor to the frame, a potentiometer with a case and a rotatable shaft extending therefrom, means positively axially and radially coupling the potentiometer shaft to the motor shaft but permitting relative rotation therebetween when the potentiometer is stalled, and means preventing rotation of the potentiometer case but permitting lateral movement thereof upon drive actuation of the motor shaft, said last-mentioned means comprising a tab secured to the potentiometer case and extending therefrom, a U-shaped bracket secured to the frame and having a pair of parallel extending arm portions straddling the said tab, an adjusting screw threaded to one arm of the bracket, and a compression spring extending between the other arm of the bracket and the tab and resiliently biasing the said tab against the said screw.

2. In a measuring instrument having a frame, a potentiometer having a case and a shaft extending therefrom, a drive shaft, means positively axially and radially coupling the potentiometer shaft to the drive shaft for drive rotation of the potentiometer shaft, a U-shaped bracket having a pair of parallel arms interconnected by a base portion secured to the frame, a tab secured to the potentiometer case and extending therefrom between the parallel arm portions of the U-shaped bracket, a compression spring between one arm of the bracket and the screw, and an adjusting screw threadedly engaging the other arm of the bracket and extending between the said arm and tab, the said compression spring resiliently biasing the tab against the adjusting screw, the potentiometer case being rotatably positioned upon rotation of the adjusting screw.

3. In a measuring instrument having a frame, a balancing motor having a shaft, means securing the balancing motor to the frame, a potentiometer with a case and a rotatable shaft extending therefrom; means positively axially and radially coupling the potentiometer shaft to the motor shaft but permitting relative rotation therebetween when the potentiometer is stalled, said means comprising a hub secured to the potentiometer shaft, said hub being provided with a cylindrical bore into which said motor shaft extends, said hub being provided with a single aperture through a wall thereof to said bore, a single shoe portion extending through said aperture, and resilient means biasing said shoe portion against the motor shaft; and means preventing rotation of the potentiometer case but permitting lateral movement thereof upon drive actuation of the motor shaft.

4. The invention as recited in claim 3 wherein the said shoe portion is formed with a concave surface which engages only one side of the said motor shaft.

5. The invention as recited in claim 3 wherein the said resilient means comprises a ring spring which at least partially encircles the hub and one end portion of which spring engages the said shoe portion and the other end portion of which engages the hub, with an outwardly turned portion for easy finger removal.

6. In a measuring instrument having a frame, a balancing motor having a shaft, means securing the balancing motor to the frame, a potentiometer with a case and a rotatable shaft extending therefrom, means positively axially and radially coupling the potentiometer shaft to the motor shaft but permiting relative rotation therebetween when the potentiometer is stalled, said means comprising a hub secured to the potentiometer shaft and provided with a cylindrical bore into which said motor shaft extends, said hub being provided with an aperture through a wall thereof to said bore, a shoe portion extending through said aperture, including means forming an annular groove in the motor shaft into which the shoe portion extends to limit relative axial movement between said hub and shaft, resilient means biasing said shoe portion against the motor shaft, and means preventing rotation of the potentiometer case but permiting lateral movement thereof upon drive actuation of the motor shaft.

References Cited by the Examiner

UNITED STATES PATENTS

| | | | |
|---|---|---|---|
| 1,471,226 | 10/23 | Whisler | 192—55 |
| 2,199,999 | 5/40 | Jensen et al. | 64—3 |
| 2,233,705 | 3/41 | Hook | 192—55 |
| 2,490,458 | 12/49 | Feldhausen | 338—116 |
| 2,730,596 | 1/56 | McLaughlin | 338—116 |
| 2,739,626 | 3/56 | Southworth et al. | 318—29 X |
| 2,889,517 | 6/59 | Ehret | 324—99 |
| 2,941,147 | 6/60 | McKinlay | 324—99 |

WALTER L. CARLSON, *Primary Examiner.*

BENNETT G. MILLER, *Examiner.*